June 12, 1956  M. C. HOFFMANN ET AL  2,750,045
FILTER
Filed Jan. 26, 1953

INVENTORS:
MELVILLE C. HOFFMANN
HARVEY E. KRATZ
By Gravely, Lieder, Woodruff & Dees
ATTORNEYS.

2,750,045

FILTER

Melville C. Hoffmann and Harvey E. Kratz, St. Louis, Mo.

Application January 26, 1953, Serial No. 333,176

8 Claims. (Cl. 210—165)

This invention relates to new and useful filters, particularly to oil filters for use in connection with automotive internal combustion engines. Filters of this type presently have to be discarded in their entirety, or a replaceable filter cartridge therein has to be replaced when the filtering elements become clogged.

One of the principal objects of the present invention is to provide a permanent oil filter which is easy to manufacture and which can be easily disassembled, cleaned, and assembled.

Another object is to provide a filter which requires the oil to pass through a plurality of individual and separate filter elements before it leaves said filter.

Another object is to provide a filter construction whose design does not permit oil to flow therethrough or therearound without being subjected to a plurality of filtering actions.

Still another object is to provide a filter which removes sludge, dirt and other foreign material, but not the additives, detergents, or other component parts of the oil itself.

A further object is to provide a construction in which the material which is filtered out of the oil collects at points which are removed from the natural path of the oil through the filter.

These and other objects and advantages will become apparent hereinafter.

This invention is embodied in a filter having a plurality of nested cones in spaced relationship. Two different types of cones are alternately mounted. One type forms separate filter elements and the other acts as guides for insuring separate filtering actions and aiding in the collection of impurities filtered out by the filter element thereabove.

Figure 1:
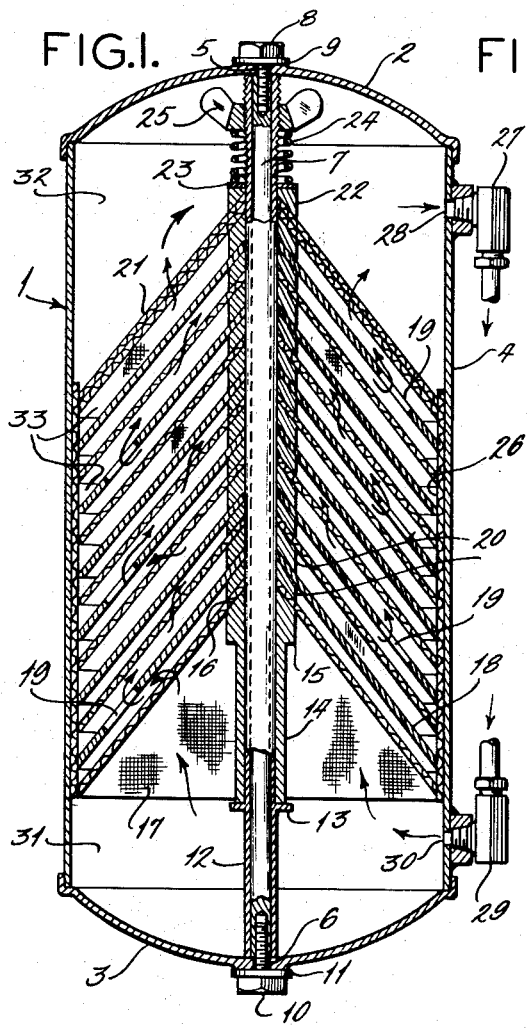
Figure 2:
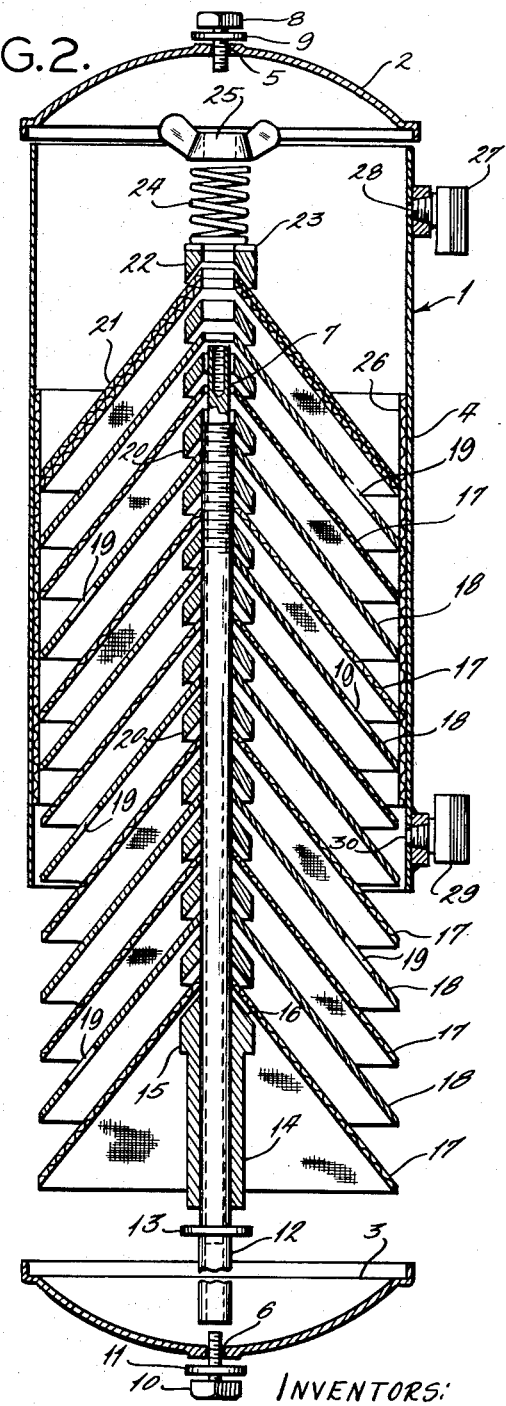
Figure 3:
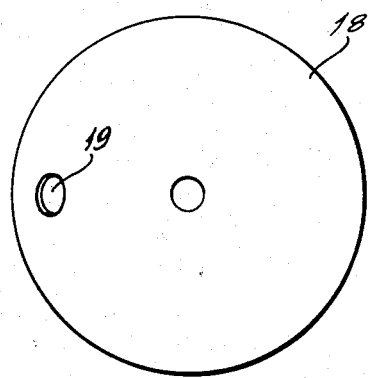
Figure 3:

The invention also consists in the parts and in the arrangement and combination of parts hereinafter described and claimed. In the accompanying drawings which form part of this specification and wherein like numerals and symbols refer to like parts wherever they occur:

Fig. 1 is a vertical cross-sectional view of an oil filter embodying this invention, Fig. 2 is an exploded vertical cross-sectional view showing the parts in slightly disassembled position, and Fig. 3 is a top plan view of one of the solid cones.

Referring now to the drawings in detail, it will be seen that the embodiment of the invention which has been illustrated is provided with a casing 1 having a top member 2 and a bottom member 3 with a cylindrical shell 4 therebetween. The top and bottom casing members 2 and 3 are provided with axially aligned holes 5 and 6 which are adapted to receive a solid rod 7 which is held in position by a cap screw 8 and washer 9 at the top and a cap screw 10 and washer 11 in the bottom. A hollow tube 12 circumscribes said rod 7 and extends from the top casing member 2 to the bottom casing member 3. The hollow tube 12 has an annular head 13 therearound which provides a seat for a sleeve 14 having an upper collar 15 thereon whose top surface 16 is inclined at about 50° from the horizontal.

A plurality of wire mesh cones 17 are alternately assembled in nested relation with respect to a plurality of solid cones 18 each having a circular hole 19 therein. The cones 17 are preferably made from about a number 50 mesh screen although the mesh size of the screen or filter element depends upon the type of installation. The holes 19 in the solid cones 18 are approximately ⅝ of an inch in diameter and are arranged 180° apart thereby lengthening the path of the oil through the filtering elements and providing greater filtering area and action. Spacer collars 20 are provided to keep the cones 17 and 18 in spaced but nested relation. The spacer collars 20 are preferably separate but may be made integral with the cones 17 and 18. Suitable orientation means may be provided for insuring that the holes 19 in alternate solid cones 18 are positioned 180° apart.

The uppermost cone 21 is preferably made from two thicknesses of wire mesh screen with a suitable spacer 22 and washer 23 mounted thereabove. A spring 24, which circumscribes the hollow tube 12, abuts against a wing nut 25 threaded to the upper portion of the hollow tube 12 and exerts a downward pressure on said nested cones 17 and 18 thereby forcing them downwardly in nested relation. A cylindrical wire mesh screen 26 circumscribes said cones 17 and 18 and fits closely against said cylindrical shell 4.

The upper portion of the casing 1 is provided with an outlet fitting 27 having an outlet passageway 28 therethrough. The lower portion is provided with an inlet fitting 29 having an inlet passageway 30 therethrough.

This construction provides an inlet chamber 31 adjacent the inlet fitting 29, an outlet chamber 32 adjacent the outlet fitting 27, and a plurality of angular dirt chambers 33 adjacent said cylindrical screen 26 and shell 4.

In operation, when the filter device is installed on an automobile engine, the oil flows (as indicated by the arrows) into the inlet passageway 30, into the inlet chamber 31 upwardly through the lowermost wire mesh cone 17 and is directed through the hole 19 of the solid cone 18 thereabove whereupon the oil is again subjected to a filtering action by the next wire mesh cone 17. This action is repeated until the oil passes through the uppermost wire mesh cone 21 and enters the outlet chamber 32 and flows out of the outlet passageway 28.

During the filtering action, the foreign matter which cannot pass through the lowermost wire mesh cone 17 falls to the bottom casing member 3, and the foreign matter which cannot pass through any upper wire mesh cone 17 falls to the top of the subjacent solid cone 18 and moves downwardly and outwardly into the annular dirt collecting chambers 33 which are out of the normal path of the oil as it flows through the device. This path or flow provides a plurality of separate filter actions arranged "in series," as distinguished from "in parallel" as in some present permanent type filters.

To clean the filter, a small pan is placed beneath the casing in order to catch the oil which is trapped in the filter. The bottom cap screw 10 and washer 11 are removed and the lower casing member 3 is removed, thereby allowing the oil which is trapped in the filter to fall into the small pan. The rod 7, hollow shaft 12, and the cones 17 and 18 with the spacers therebetween and the cylindrical screen 26 are removed as a unit by unscrewing the upper cap screw. The cones 17 and 18 are removed from the shaft 12 by loosening the nut 25 and removing the spring 24 and the cones 17 and 18 and spacer collars 20. The cones and collars can be cleaned separately and then reassembled.

It has been found that a filter using the hereinbefore described construction is substantially the same size as present filters, and that approximately eight No. 50 mesh or smaller cones provide better results. The solid cones add to the strength and rigidity of the entire structure. It has also been found that this filter has a higher capacity for filtering oil than those presently being used. It has also been found that for best results and flow characteristics, the lower edge of the ⅝ inch hole 19 in the solid cones 18 should be positioned from the bottom of the cone a distance equal to one fourth of the inclined height of the cone from the bottom to its apex. That is, the bottom edge of said hole 19 is tangent to a line positioned vertically upwardly from the bottom of the cone a distance equal to one fourth of the vertical height of the cone from the bottom to its apex.

This invention is intended to cover all changes and modifications of the example of the invention herein chosen for purposes of the disclosure, which do not constitute departures from the spirit and scope of the invention.

What we claim is:

1. A filter device comprising a casing having inlet and outlet openings, a rod extending substantially from the top to the bottom of said casing, a plurality of wire mesh cones alternately mounted on said rod in nested relation with respect to a plurality of solid cones mounted on said rod, each of said solid cones having an opening therein, the opening in one solid cone being out of alignment with the opening in the next succeeding solid cone, said cones being maintained in spaced relation and having their peripheral edges in contacting relation with said casing, said nested cones being operatively positioned between said inlet and outlet openings.

2. A filter device comprising a casing having an inlet opening and an outlet opening with a plurality of alternately positioned conical filtering elements and a plurality of interposed conical elements therein, each of said interposed conical elements having an opening therein, the bottom of said opening being positioned upwardly from the bottom of said conical element approximately one fourth the height thereof, said elements being positioned in spaced nested relation and arranged so that the fluid to be filtered must pass through each of said filtering elements, one after the other, said elements being operatively positioned between said openings and being in contacting relation with said casing.

3. A filter device comprising a casing having inlet and outlet openings, a rod extending substantially from the top to the bottom of said casing, a plurality of wire mesh cones alternately mounted in nested relation on said rod with respect to a plurality of solid cones mounted on said rod, each of said solid cones having an opening therein, said openings in said solid cones being out of alignment with one another and having their bottoms positioned upwardly from the bottoms of said solid cones approximately one fourth the height of said solid cones, said cones being maintained in spaced relation by means of spacer collars, said cones and said collars being in circumscribing relation to said rod, said cones being in contacting relation with said casing and being operatively positioned between said inlet and outlet openings.

4. A filter device comprising a casing having an inlet and an outlet, said casing having top and bottom casing members with axially aligned holes therein, a rod extending substantially from top to bottom having ends adjacent to said holes, a hollow shaft circumscribing said rod, said hollow shaft being provided with vertically adjustable means in the upper portion thereof and a seat in the lower portion thereof, a plurality of nested conical filter elements alternately positioned in spaced relation with respect to a plurality of nested solid conical elements on said shaft, said solid elements each having a hole therein, a filtering element contacting and circumscribing the outer peripheral edges of said conical elements, said circumscribing element contacting said case elements, said conical elements having spacer elements therebetween, the lower spacer element resting on the seat of said hollow shaft, and a spring positioned between said vertically adjustable means and the uppermost conical elements, said elements being operatively positioned between said inlet and said outlet, said filter being adapted to perform a plurality of filtering operations, one after the other, said bottom casing member being removably secured to said casing.

5. A filter device comprising a casing having an inlet and an outlet, said casing having top and bottom casing members with axially aligned holes therein, a rod extending substantially from top to bottom having ends adjacent to said holes, a hollow shaft circumscribing said rod, said hollow shaft being provided with vertically adjustable means in the upper portion thereof and a seat in the lower portion thereof, a plurality of nested conical filter elements alternately positioned with respect to a plurality of nested solid conical elements on said shaft, said solid elements each having a hole therein and forming an annular collecting chamber thereabove, a cylindrical filtering element contacting and circumscribing the outer peripheral edges of said conical elements, said conical elements having spacer elements therebetween, the lower spacer element resting on the seat of said hollow shaft, and a spring positioned between said vertically adjustable means and the uppermost conical element, said conical elements and said spacer elements being in circumscribing relation to said hollow shaft, said elements being operatively positioned between said inlet and said outlet, said filter being adapted to perform a plurality of filtering operations, one after the other, said bottom casing member being removably secured to said casing.

6. A filter device comprising a casing having an inlet and an outlet, said casing having top and bottom casing members with axially aligned holes therein, a rod extending substantially from top to bottom having ends adjacent to said holes, a hollow shaft circumscribing said rod, said hollow shaft being provided with vertically adjustable means in the upper portion thereof and a seat in the lower portion thereof, a plurality of nested conical filter elements alternately positioned with respect to a plurality of nested solid conical elements, said solid elements each having a hole therein and forming an annular collecting chamber thereabove, said hole having its bottom positioned from the bottom of said cone a distance equal to approximately one fourth the distance from the bottom of said cone to the apex thereof, a cylindrical filtering element contacting and circumscribing the outer peripheral edges of said conical elements, said conical elements having spacer elements therebetween, the lower spacer element resting on the seat of said hollow shaft, and a spring positioned between said vertically adjustable means and the uppermost conical member, said conical elements and said spacer elements being in circumscribing relation to said hollow shaft, said elements being operatively positioned between said inlet and said outlet, said filter being adapted to perform a plurality of filtering operations, one after the other, said bottom casing member being removably secured to said casing.

7. A filter device comprising a casing having inlet and outlet openings, a plurality of wire mesh cones mounted in nested relation within said casing alternately and in spaced relation with respect to a plurality of solid cones, said cones being operatively positioned between said inlet and outlet openings and having their outer edges in effective contacting relation with said casing to prevent flow between said outer edges and said casing, each of said solid cones having an opening therein, the opening in one of said solid cones being out of alignment with the opening in the next succeeding solid cone, the bottoms of said openings being positioned upwardly from the bottoms of said solid cones approximately one fourth the height of said solid cones, so that the fluid to be filtered passes through each of said cones one after the other.

8. A filter device comprising a casing having inlet and outlet openings, a rod extending substantially from the top to the bottom of said casing, a plurality of wire mesh cones alternately mounted in spaced nested relation on said rod with respect to a plurality of solid cones mounted on said rod, said cones being operatively positioned between said inlet and outlet openings and having their peripheral edges in effective contacting relation with said casing to prevent flow between said outer edges and said casing, each of said solid cones having an opening therein, the opening in one of said solid cones being out of alignment with the opening in the next succeeding solid cone, the bottoms of said openings being positioned upwardly from the bottoms of said solid cones approximately one fourth the height of said solid cones, so that the fluid to be filtered passes through each of said cones one after the other.

References Cited in the file of this patent

UNITED STATES PATENTS

| | | |
|---|---|---|
| 1,081,936 | Hapgood | Dec. 16, 1913 |
| 1,197,634 | Hull | Sept. 12, 1916 |
| 1,470,719 | Gannon | Oct. 16, 1923 |
| 1,602,935 | Rasey | Oct. 12, 1926 |
| 1,847,817 | Cole | Mar. 1, 1932 |
| 2,507,818 | Sager | May 16, 1940 |

FOREIGN PATENTS

| | | |
|---|---|---|
| 22,409 | Great Britain | of 1901 |